United States Patent [19]

Olsson

[11] Patent Number: 5,458,228
[45] Date of Patent: Oct. 17, 1995

[54] DEVICE FOR CARRYING AN ENDLESS CONVEYOR BELT

[75] Inventor: Lennart Olsson, Nyhamnsläge, Sweden

[73] Assignee: Frigoscandia Equipment Aktiebolag, Helsingborg, Sweden

[21] Appl. No.: 284,547

[22] PCT Filed: Feb. 16, 1994

[86] PCT No.: PCT/SE93/00118

§ 371 Date: Aug. 8, 1994

§ 102(e) Date: Aug. 8, 1994

[87] PCT Pub. No.: WO93/15984

PCT Pub. Date: Aug. 19, 1993

[30] Foreign Application Priority Data

Feb. 17, 1992 [SE] Sweden ................................. 9200452

[51] Int. Cl.⁶ ........................................ B65G 21/18
[52] U.S. Cl. ............................................... 198/778
[58] Field of Search ........................................ 198/778

[56] References Cited

U.S. PATENT DOCUMENTS 4,565,282  1/1986  Olsson et al. ......................... 198/778
4,899,871  2/1990  Olsson ................................... 198/778
5,031,751  7/1991  Pahlsson ............................ 198/778 X
5,350,056  9/1994  Hager .................................... 198/778

FOREIGN PATENT DOCUMENTS 0062570  10/1982  European Pat. Off. .............. 198/778
0130913   6/1987  Japan .................................... 198/778

*Primary Examiner*—James R. Bidwell
*Attorney, Agent, or Firm*—Browdy and Neimark

[57] ABSTRACT

A device for carrying an endless conveyor belt (1) along a helical part of its path comprises a frame (9, 10) supporting an outer ball track and an inner ball track, each arranged under a lateral portion (22, 23) of the conveyor belt along at least a section of the helical part of the conveyor belt path. Each ball track is formed of a plurality of ball-bearing elements (11) disposed helically after one another and each having a plurality of balls (21) in an endless ball track with an upper circular-arc-shaped track section (19) and a lower track section (20) which connects with the upper track section to form the endless ball track. The lateral portions (22, 23) of the conveyor belt (1) rest on the balls (21) in the upper track sections (19) of the ball-bearing elements (11).

20 Claims, 6 Drawing Sheets

DEVICE FOR CARRYING AN ENDLESS CONVEYOR BELT

BACKGROUND OF THE INVENTION

1. Technical Field of the Invention

The present invention relates to a device for carrying an endless conveyor belt along a helical part of its path, said device comprising a frame supporting an outer bearing track and an inner bearing track, each provided below a lateral portion of the conveyor belt along at least a section of the helical part of the belt conveyor.

2. Prior Art

U.S. Pat. No. 4,565,282 and U.S. Pat. No. 4,899,871 disclose devices of this type. Here, use is made of two endless chains, each resting on balls in one of the bearing tracks, for carrying the conveyor belt.

OBJECT AND SUMMARY OF THE INVENTION

The object of the present invention is to improve the prior-art devices, especially with a view to facilitating maintenance and reducing the torque produced by the load take-up on the conveyor belt, when being of self-supporting type.

According to the invention, this object is achieved by a device of the above type, which is characterised in that at least the one bearing track-is formed of a plurality of rolling-bearing units disposed helically after one another and each having a plurality of rolling elements in an endless rolling track having an upper circular-arc-shaped track section and a lower track section which connects with the upper track section to form the endless rolling track, and that at least one of the lateral portions of the conveyor belt rests on the rolling elements in the upper track sections of the corresponding rolling-bearing units.

It is understood that if a rolling element, e.g. a ball, in the device according to the invention becomes out-of-round or cracks, this is easily taken care of by replacing the rolling-bearing unit containing this particular rolling element. Neither does this have any effect on the performance of most of the rolling elements of the device.

The arrangement according to the invention also permits the use of rolling elements of relatively small diameter, which in turn enables load take-up producing less torque. As a result of the small diameter, it is also advantageous in terms of economy to use rolling elements of stainless steel, which reduces the risk of damage to the rolling elements.

Finally, it is of great significance that the arrangement according to the invention makes it possible to dispense with either one or both chains.

In one embodiment of the device according to the invention, at least one of the lateral portions of the conveyor belt can thus rest directly on the rolling elements, the inner lateral portion of the conveyor belt suitably engaging a rotary drum arranged inwardly of the inner bearing track to drive the conveyor belt.

In other embodiments of the device according to the invention, an endless chain can be arranged either between the rolling elements of the inner bearing track and the corresponding lateral portion of the conveyor belt, or between the rolling elements of the outer bearing track and the corresponding lateral portion of the conveyor belt. In both cases, the chain is conveniently used for driving the conveyor belt.

In yet another embodiment of the device according to the invention, use is made of both the endless chains, in which case either one of these or both can be used for driving the conveyor belt.

Preferably, each chain supports rollers in rolling contact with, respectively, a stationary drum arranged inwardly of the inner bearing track and a stationary guide ring arranged outwardly of the outer bearing track.

Although the device according to the invention is especially suitable for use with conveyor belts of self-supporting type, as described in e.g. U.S. Pat. No. 3,938,651, U.S. Pat. No. 4,603,776 and U.S. Pat. No. 4,941,567, it is advantageously used also with conveyor belts of non-self-supporting type. In that case, the outer and the inner bearing track must, however, extend along substantially the entire helical part of the conveyor belt path.

When the device according to the invention is used with a conveyor belt of self-supporting type, it is sufficient that the inner and the outer bearing track extend round approximately the lowermost turn of the helical part of the conveyor belt path.

The invention will be described in more detail below with reference to the accompanying drawings, in which FIG. 3 is a perspective view, FIG. 4 is a side view.

DETAILED DESCRIPTION OF THE PREFERRED EMBODIMENT(S) OF THE INVENTION

Figure 1:
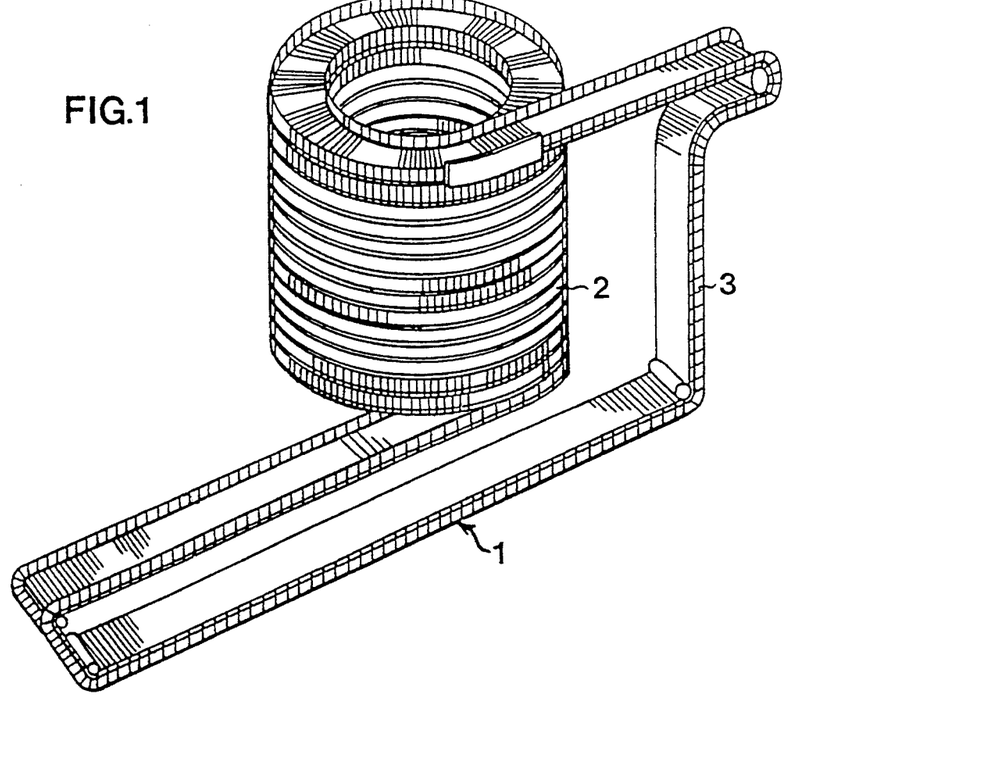
FIG. 1 is a perspective view of a self-supporting endless conveyor belt, in which the device according to the invention is especially usable.

FIG. 1 shows a conveyor belt 1 which, along part of its path, runs helically in a number of turns so as to form a pile 2. The conveyor belt 1 is endless, and travels from the upper end of the pile 2 in a run 3 outside the pile 2 to the lower end of the pile. However, the direction of rotation of the pile 2 is optional, and the belt 1 may thus leave the pile 2 at the lower end as well.

To be able to move in a helical path, as shown in FIG. 1, the belt 1 consists, in a manner known per se, of a plurality of link means 4 (FIGS. 6–9). These link means extend in the lateral direction of the belt 1 and are so displaceable horizontally in relation to one other in the longitudinal direction of the belt that the belt can pivot or turn sideways. The link means are also vertically pivotable in relation to one another about an axis parallel to the lateral direction. Thus, the belt 1 is able to take an endless path of the type shown in FIG. 1, i.e. having straight sections and curved sections along vertical and horizontal curves.

Further, the belt 1 is self-supporting or pilable to form the pile 2 by each link means consisting of rod-shaped means 5 which form part of the bottom of the belt 1 and at the ends of which upright links 6, forming the sides of the belt, serve as spacers arranged to be applied, with their upper edge portions 7, against lower edge portions 8 of the spacers 6 of the overlying turn, thereby supporting the belt 1 in the overlying turn.

Figure 2:
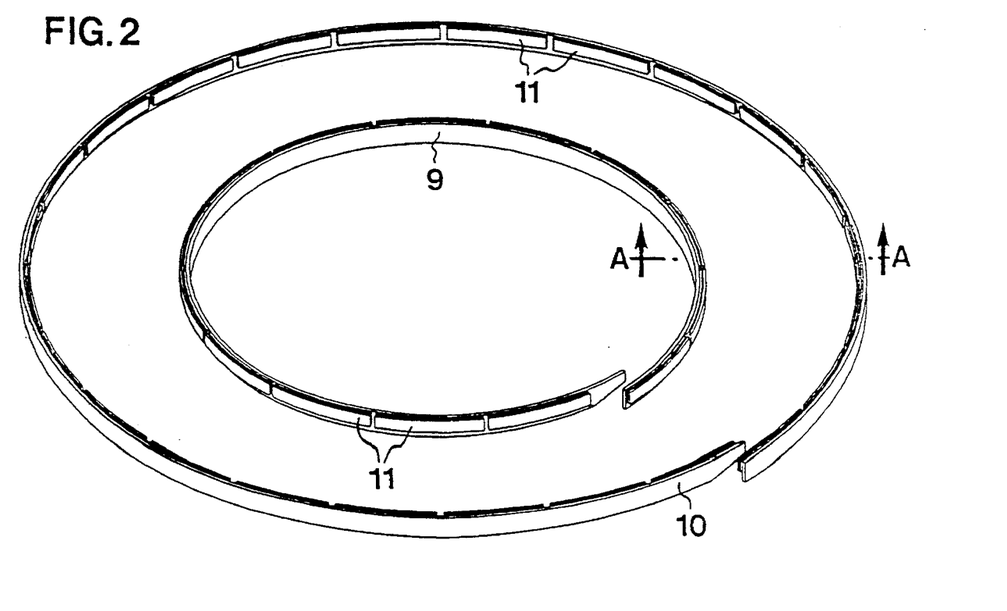
FIG. 2 is a schematic perspective view of part of an embodiment of the device according to the invention.

The pile 2 of the superimposed helical turns of the endless conveyor belt is supported by a device according to the invention. As schematically shown in FIG. 2, this device comprises two rails 9 and 10 arranged below the lowermost turn of the belt pile 2. These rails 9 and 10 support a plurality of successive rolling-bearing units in the form of ball-bearing units 11. The rails 9 and 10 extend through approximately one turn of the belt pile 1, i.e. the lowermost turn. Advantageously, the rails extend through more than one turn, e.g. 1 ¼ turns. Further, the rails 9 and 10 are fixedly mounted on a base (not shown in FIG. 2), with which they form a frame.

Conveniently, the ball-bearing units 11 are mounted fairly close to one another throughout the entire length of the rails 9 and 10. These units are substantially identical, and a ball-bearing unit 11 will be described in more detail below with reference to FIGS. 3–5. Thus, each ball-bearing unit 11 consists of an inner plate 12, an outer plate 13 and a spacer plate 14. The plates 12–14 are fixedly mounted on each rail 9, 10 by means of bolts (not shown) extending through registering holes 15 in the plates 12–14 and the respective rails 9, 10. A groove 17 having a circular-arc-shaped profile is provided in each plate 12, 13, as illustrated in FIG. 4 in respect of the plate 12. The spacer plate 14 has a profile conformed to that of the groove 17 but conveniently being rectilinear, so that the plates 12, 13 and 14 form, when mounted, an endless ball track 18 having a substantially circular-arc-shaped cross-section. Further, the plates 12–14 are curved in circular-arc fashion so as to conform to the helical shape of the rails 9 and 10. Thus, the endless ball track 18 has an upper circular-arc-shaped track section 19 and a lower track section 20 which connects with the upper track section 19 to form the endless ball track 18. Moreover, the upper track section 19 is so positioned in relation to the plates 12 and 13 that a plurality of balls 21 movable in and round the ball track 18 project above the upper boundary surfaces of the plates 12, 13.

Figure 6:
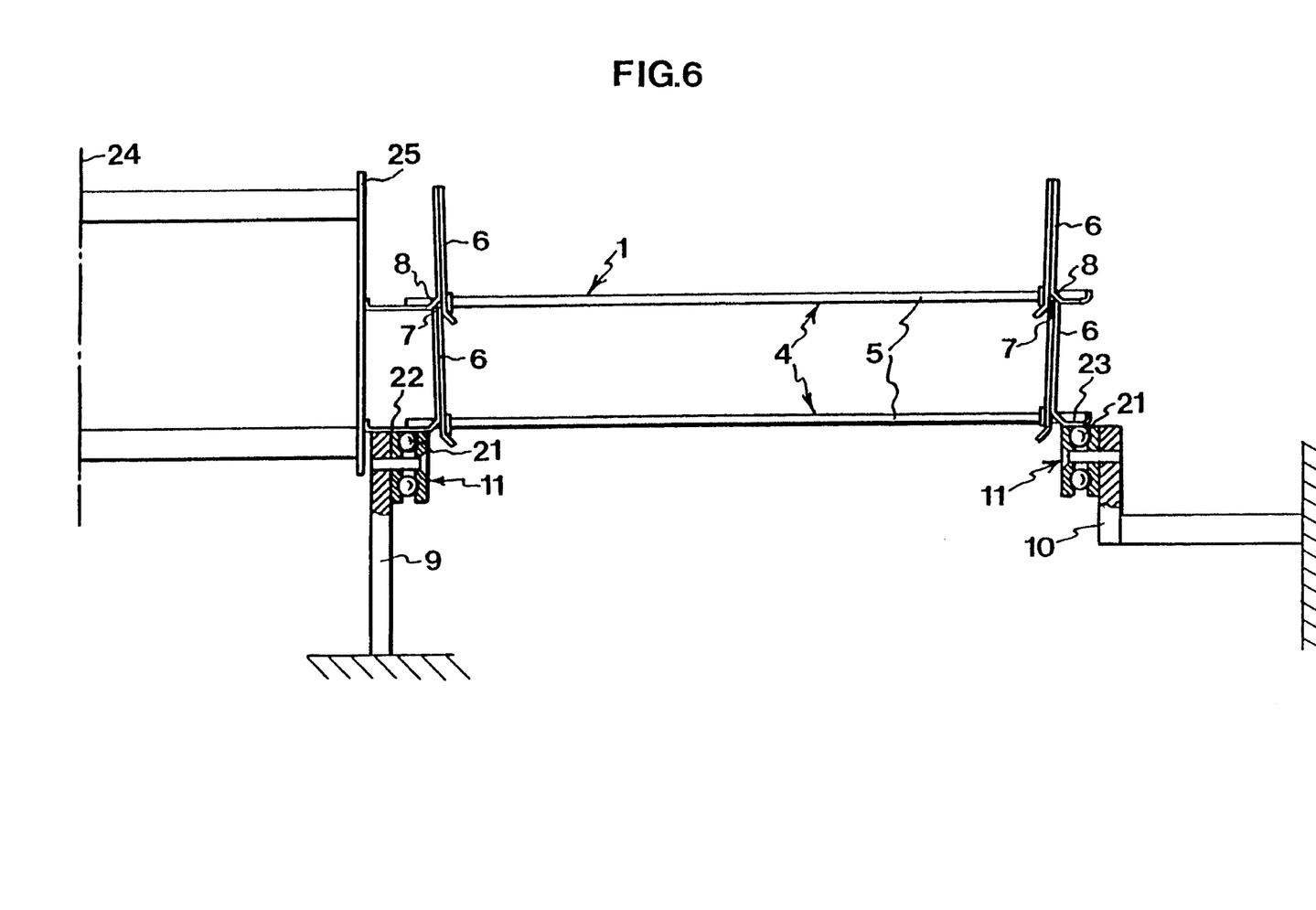
FIGS. 6–9 are cross-sectional views taken along the line A—A in FIG. 2 and illustrating four different embodiments of the device according to the invention.

In a first embodiment of the device according to the invention shown in FIG. 6, the lateral portions 22 and 23 of the conveyor belt 1 rest, in the lowermost turn of the pile 2, directly on the balls 21 of the ball-bearing units 11 in the upper track sections 19. In one or more of the lowermost turns of the belt pile 2, the inner lateral portions 22 of the belt 1 also engage the periphery of a drum 25 mounted within the belt pile 2 and rotatable about a centre axis 24. Suitably, the engagement is such that the drum 25 can be used for driving the belt 1, and consequently the entire belt pile 2. Additional drive means may be provided along the outer belt run 3 shown in FIG. 1.

Figure 7:
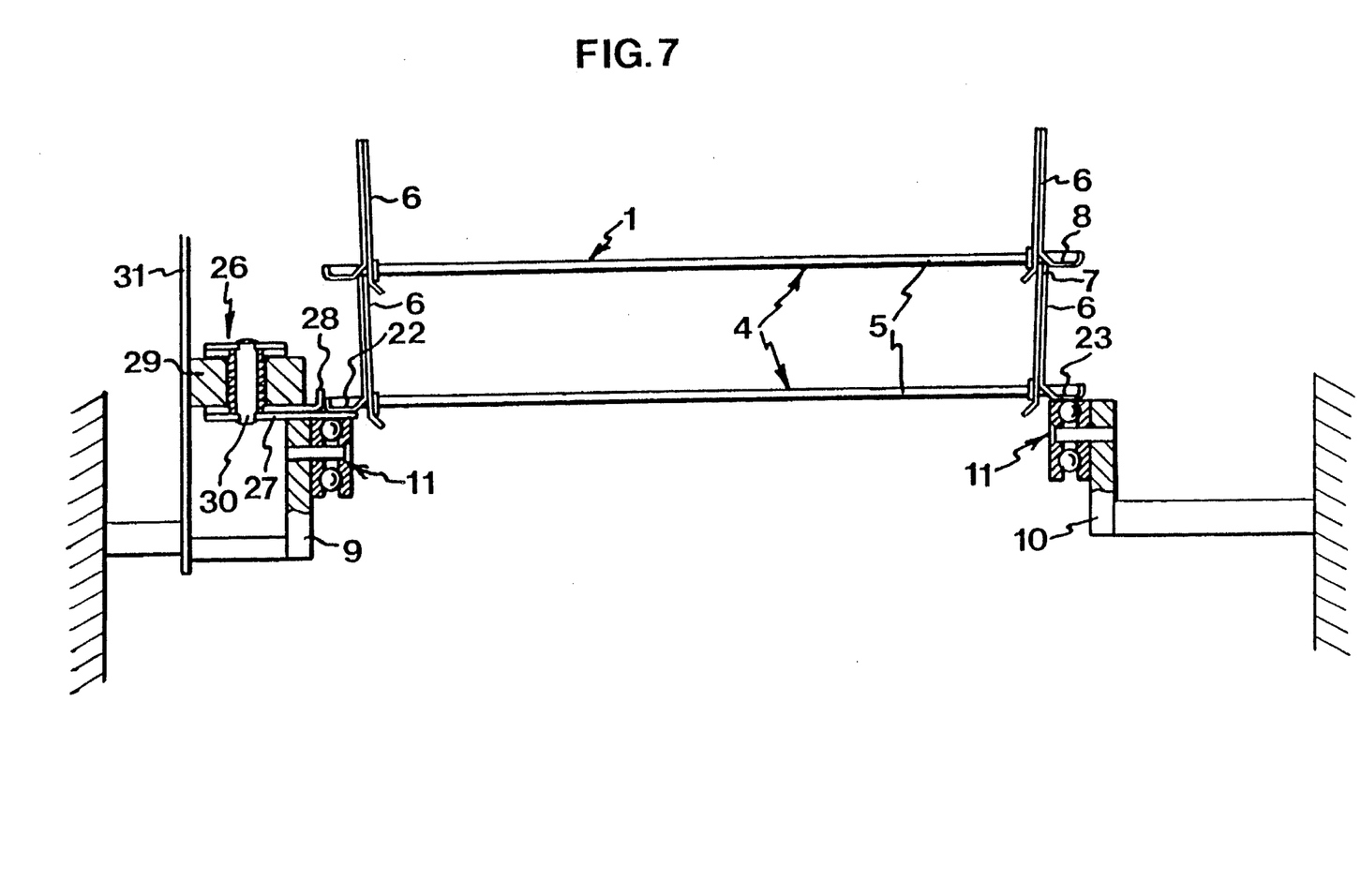

In a second embodiment of the device according to the invention shown in FIG. 7, use is made of a chain 26 having flat links 27 which are rotatably interconnected and partly project in between the balls 21 of the inner ball track, consisting of the successive upper track sections 19, and the inner lateral portion 22 of the conveyor belt 1 in the lowermost turn of the belt pile 2. The links 27 have an upright abutment 28 for engaging the inner side edge of the lateral portion 22. Each link 27 of the chain 26 is further equipped with a roller 29 which is rotatably mounted on a vertical shaft 30. The rollers 29 engage the peripheral surface of a stationary drum 31 disposed centrally in the belt pile 2. The chain 26 follows the rail 9 along substantially its entire extent and takes a return path inside the drum 31 through openings provided therein at each end of the rail 9. In the embodiment according to FIG. 7 (as in that according to FIG. 6), the outer lateral portions 23 of the belt 1 rest directly on the balls 21 in the outer ball track along the rail 10.

Figure 8:
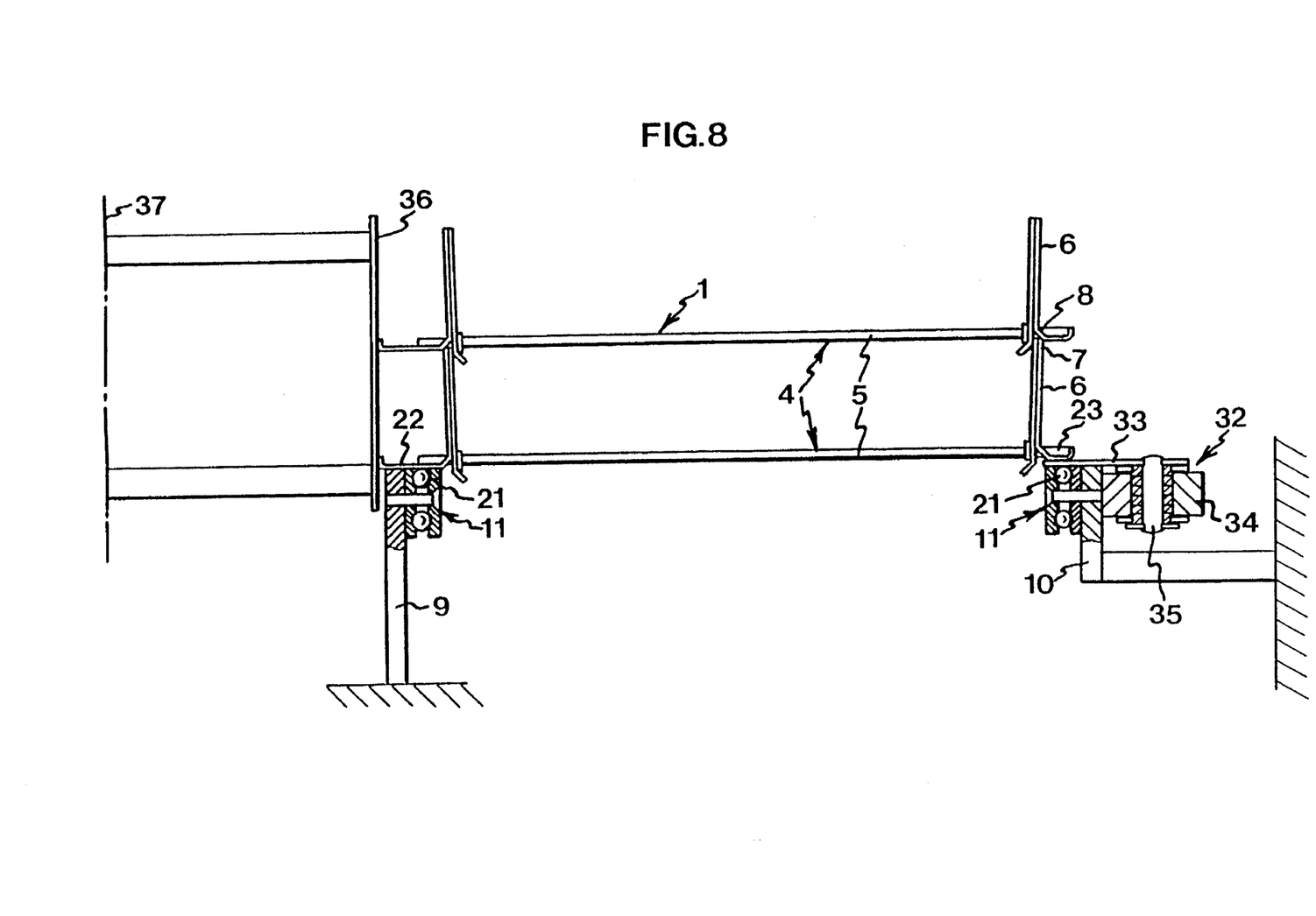

In a third embodiment of the device according to the invention shown in FIG. 8, a chain 32, similar to the chain 26, is used for driving the conveyor belt 1. However, the chain 32 is arranged along the outer rail 10, and its links 33 project in between the balls 21 of the outer ball track and the corresponding lateral portions 23 of the conveyor belt in the lowermost turn thereof. Also the link 33 has a roller 34 which is rotatably mounted on a vertical shaft 35 and makes rolling contact with a guide ring formed by the outer rail 10. As in the embodiment shown in FIG. 6, the inner lateral portions 22 of the belt 1 engage the peripheral surface of a drum 36 which is rotatable about an axis 37 at the centre of the belt pile 2. The drum 36 or the chain 32, or both, can be used for driving the belt 1, and consequently the belt pile 2.

Figure 9:
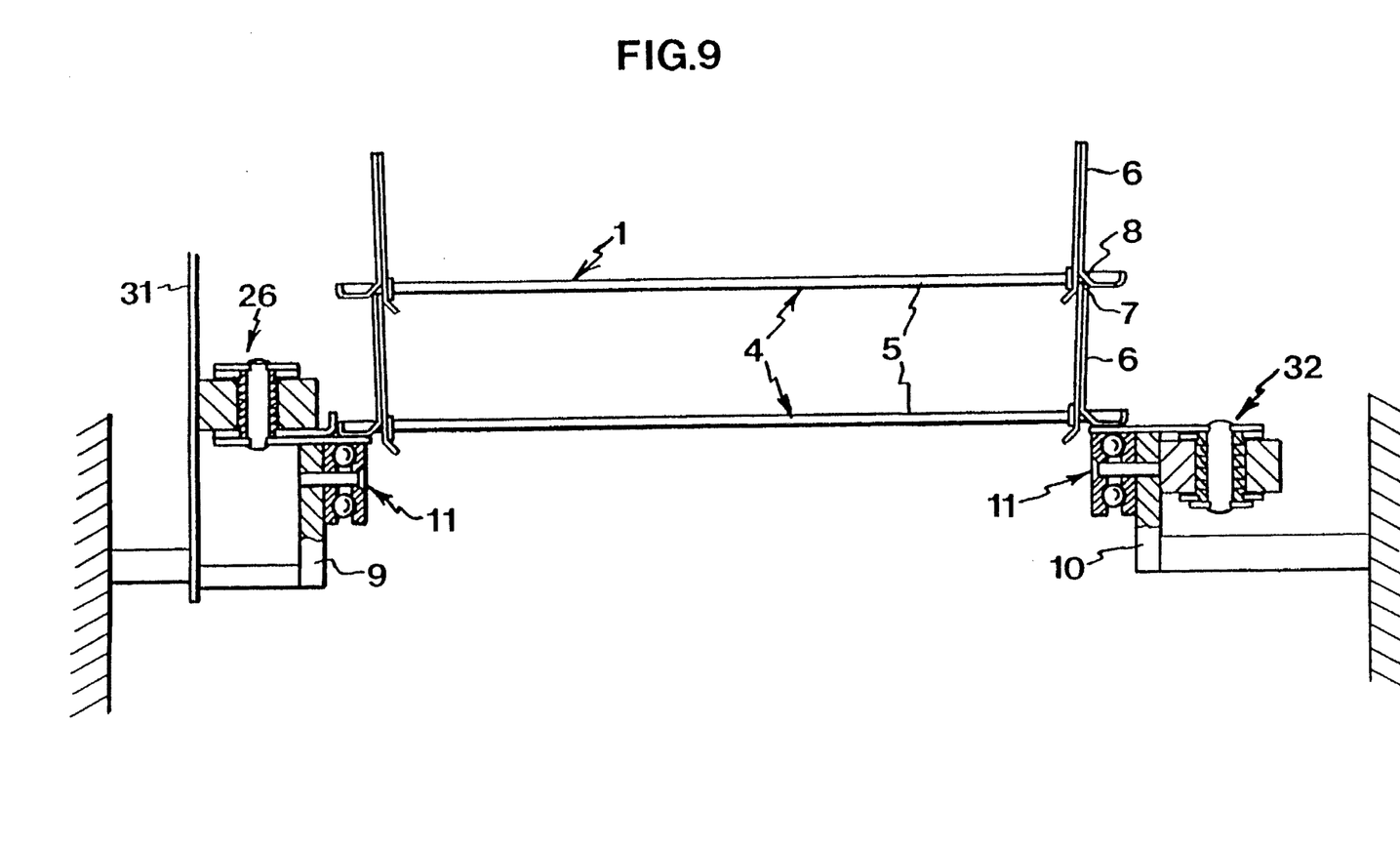

A fourth embodiment of the device according to the invention shown in FIG. 9 essentially is a combination of the embodiments shown in FIGS. 7 and 8. In the embodiment shown in FIG. 9, both the chain 26 and the chain 32 are used, as well as the stationary drum 31. Here, the belt 1 is driven either by the chain 26 or the chain 32, or by both chains 26 and 32.

The ball-bearing units 11 of the invention enable the use of balls 21, preferably of stainless steel, having a small diameter. Thus, the load of the pile 2 can be transmitted to the balls 21 close to the upright links 6. Consequently, the torque acting on the rod-shaped means 5 of the belt 1 will be small, which reduces the risk of deformation of the means 5.

Figure 3:
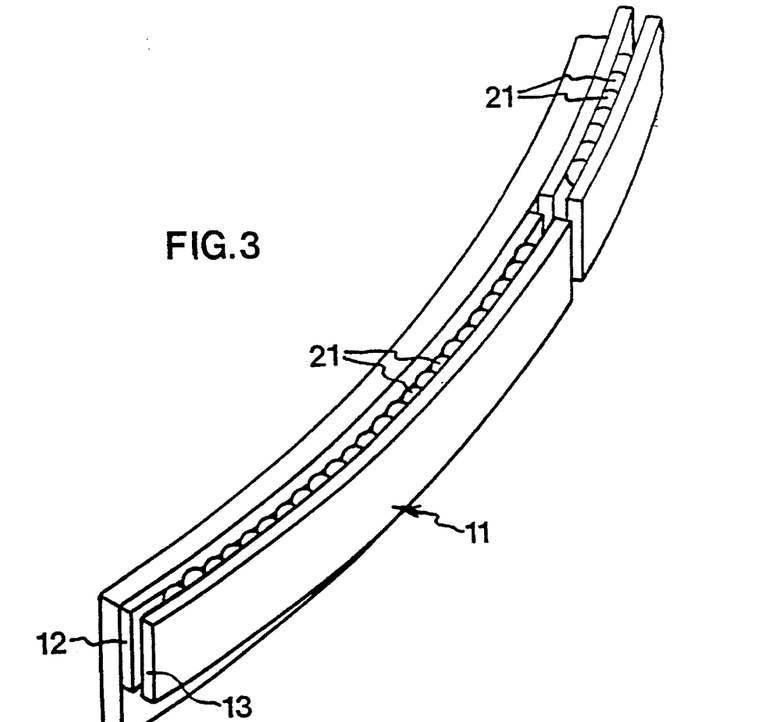
Figure 4:
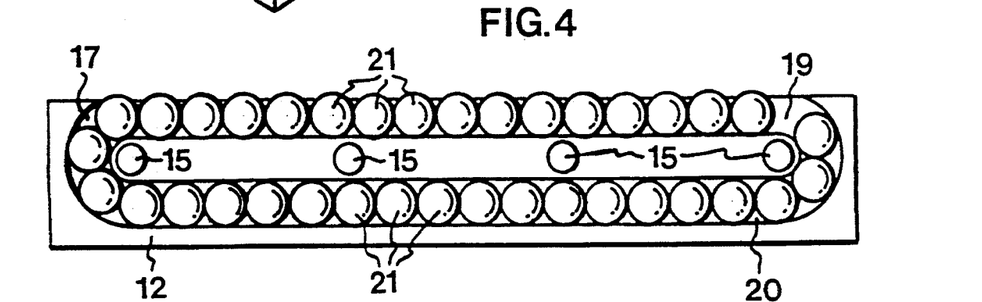
Figure 5:
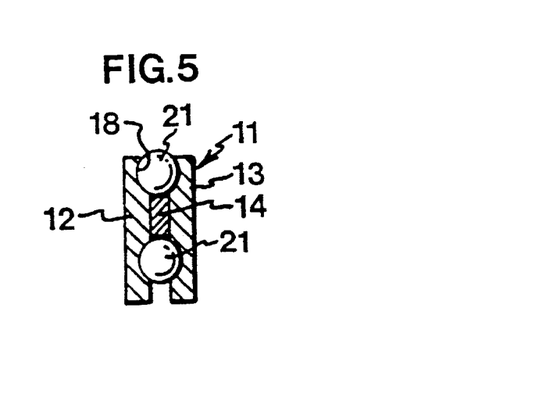
FIG. 5 is a cross-sectional view of a rolling-bearing element forming part of the device according to the invention.

As appears from FIGS. 3–5, the endless ball track 18 is open along its entire extent. This confers the advantage that particles, e.g. ice, entering the ball track 18 can also escape therefrom.

It goes without saying that the embodiments described above may be modified within the scope of the invention as defined by the appended claims. Thus, use can be made of other rolling elements than balls, e.g. rollers, which then preferably are cambered or possibly conical. Further, both bearing tracks need not present the inventive rolling-bearing units, but the one bearing track may be of any other suitable type, e.g. a slide-bearing track. This variant may suitably be used when the belt pile is of short height, in which case the mass carried by the device according to the invention is low and a slide-bearing track on one of the rails 9, 10 does not give rise to excessive frictional forces.

I claim:

1. A device for carrying an endless conveyor belt (1) along a helical part of its path, said device comprising a frame (9, 10) supporting an outer bearing track and an inner bearing track, each provided below a lateral portion (22, 23) of the conveyor belt along at least a section of the helical part of the conveyor belt path, characterised in that at least one bearing track is formed of a plurality of rolling-bearing units (11) disposed helically after one another, each having a plurality of rolling elements (21) in an endless rolling track (18) comprising an upper circular-arc-shaped track section (19) and a lower track section (20) which connects with the upper track section so as to form the endless rolling track, and that at least one of the lateral portions (22, 23) of the conveyor belt (1) rests on the rolling elements (21) in the upper track sections (19) of the corresponding rolling-bearing units (11).

2. A device as claimed in claim 1, characterised in that at least one of the lateral portions (22, 23) of the conveyor belt (1) rests directly on the rolling elements (21), and that the inner lateral portion (22) of the conveyor belt preferably engages a rotary drum (25) provided inwardly of the inner bearing track for driving the conveyor belt.

3. A device as claimed in claim 1, characterised in that the inner bearing track is formed of the rolling-bearing units (11), and that an endless chain (26) is arranged between the rolling elements (21) of the inner rolling track and the corresponding lateral portion (22) of the conveyor belt (1) for driving the latter.

4. A device as claimed in claim 3, characterised in that the chain (26) supports rollers (29) in rolling contact with a stationary drum (31) arranged inwardly of the inner bearing track.

5. A device as claimed in claim 1, characterised in that the outer bearing track is formed of the rolling-bearing units (11), and that an endless chain (32) is arranged between the rolling elements (21) of the outer rolling track and the corresponding lateral portion (23) of the conveyor belt (1) for driving the latter.

6. A device as claimed in claim 5, characterised in that the chain (32) supports rollers (34) in rolling contact with a stationary guide ring (10) arranged outwardly of the outer bearing track.

7. A device as claimed in claim 6, characterised in that the inner lateral portion (22) of the conveyor belt (1) engages a rotary drum (36) arranged inwardly of the inner bearing track.

8. A device as claimed in claim 1, characterised in that only the one bearing track is formed of the rolling-bearing units.

9. A device as claimed in claim 1, characterised in that both bearing tracks are formed of the rolling-bearing units (11), that an endless inner chain (26) and an endless outer chain (32) are arranged, respectively, between the rolling elements (21) of the inner bearing track and the corresponding lateral portion (22) of the conveyor belt (1) and between the rolling elements (21) of the outer bearing track and the corresponding lateral portion (23) of the conveyor belt, and that driving means are arranged to cooperate with at least one of the chains (26, 32) for driving the conveyor belt.

10. A device as claimed in claim 9, characterised in that the inner chain (26) supports rollers (29) in rolling contact with a stationary drum (31) arranged inwardly of the inner bearing track, and that the outer chain (32) supports rollers (34) in rolling contact with a stationary guide ring (10) arranged outwardly of the outer bearing track.

11. A device as claimed in claim 1, characterised in that the conveyor belt (1) is of self-supporting type, and that the inner and the outer bearing track extend throughout approximately the lowermost turn of the helical part (2) of the path of the conveyor belt (1).

12. A device as claimed in claim 1, characterised in that the rolling elements (21) are balls.

13. A device as claimed in claim 5, characterised in that the inner lateral portion (22) of the conveyor belt (1) engages a rotary drum (36) arranged inwardly of the inner bearing track.

14. A device as claimed in claim 13, characterised in that only the one bearing track is formed of the rolling-bearing units.

15. A device as claimed in claim 14, characterised in that the conveyor belt (1) is of self-supporting type, and that the inner and the outer bearing tracks extend throughout approximately the lowermost turn of the helical part (2) of the path of the conveyor belt (1).

16. A device as claimed in claim 15, characterised in that the rolling elements (21) are balls.

17. A device as claimed in claim 4, characterised in that only the one bearing track is formed of the rolling-bearing units.

18. A device as claimed in claim 17, characterised in that the conveyor belt (1) is of self-supporting type, and that the inner and the outer bearing tracks extend throughout approximately the lowermost turn of the helical part (2) of the path of the conveyor belt (1).

19. A device as claimed in claim 18, characterised in that the rolling elements (21) are balls.

20. A device as claimed in claim 6, characterised in that the conveyor belt (1) is of self-supporting type, and that the inner and the outer bearing tracks extend throughout approximately the lowermost turn of the helical part (2) of the path of the conveyor belt (1).

* * * * *

UNITED STATES PATENT AND TRADEMARK OFFICE
CERTIFICATE OF CORRECTION

PATENT NO.   : 5,458,228
DATED        : October 17, 1995
INVENTOR(S)  : Lennart OLSSON It is certified that error appears in the above-indentified patent and that said Letters Patent is hereby corrected as shown below:

Title page, item [22], change "Feb. 16, 1994" to --Feb. 16, 1993--.

Signed and Sealed this

Ninth Day of April, 1996

Attest:

BRUCE LEHMAN

Attesting Officer    Commissioner of Patents and Trademarks